United States Patent
Luo et al.

(10) Patent No.: US 9,240,864 B2
(45) Date of Patent: Jan. 19, 2016

(54) BLIND CRS DETECTION

(71) Applicant: QUALCOMM Incorporated, San Diego, CA (US)

(72) Inventors: Xiliang Luo, San Diego, CA (US); Wenshu Zhang, San Diego, CA (US); Keith William Saints, San Diego, CA (US); Ke Liu, San Diego, CA (US); Kapil Bhattad, Bangalore (IN); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 14/191,243

(22) Filed: Feb. 26, 2014

(65) Prior Publication Data

US 2015/0071387 A1 Mar. 12, 2015

Related U.S. Application Data (60) Provisional application No. 61/877,231, filed on Sep. 12, 2013.

(51) Int. Cl.
*H04L 1/00* (2006.01)
*H04L 5/00* (2006.01)
(Continued)

(52) U.S. Cl.
CPC ............ *H04L 1/0054* (2013.01); *H04L 5/005* (2013.01); *H04L 25/0212* (2013.01); *H04L 25/067* (2013.01); *H04L 27/2656* (2013.01); *H04L 5/0023* (2013.01)

(58) Field of Classification Search
CPC ... H04L 1/0045; H04L 1/0046; H04L 1/0047; H04L 1/0048; H04L 1/005; H04L 1/0054; H04L 5/0048; H04L 5/005; H04L 27/2656; H04L 27/2657; H04L 27/2662; H04L 27/2666; H04L 5/0023; H04L 25/0212; H04L 25/067
USPC ........... 375/260–262, 265, 267; 370/208, 210
See application file for complete search history.

(56) References Cited

U.S. PATENT DOCUMENTS

| 8,229,036 B2 | 7/2012 | Kolze |
| 2005/0195765 A1* | 9/2005 | Sharon et al. ................. 370/330 |

(Continued)

FOREIGN PATENT DOCUMENTS

WO WO-2013006197 A1 1/2013

OTHER PUBLICATIONS

International Search Report and Written Opinion—PCT/US2014/019101—ISA/EPO—Jun. 3, 2014.
Oularbi M.R., et al., "Enumeration of Base Station Antennas in a Cognitive Receiver by Exploiting Pilot Patterns," IEEE Communications Letters, Jan. 1, 2013, vol. 17 (1), pp. 8-11, XP011488818, ISSN: 1089-7798, DOI: 10.1109/LCOMM.2012.112812.121956, abstract, p. 8-p. 11.

(Continued)

*Primary Examiner* — Young T Tse
(74) *Attorney, Agent, or Firm* — Patterson & Sheridan, LLP (57) ABSTRACT

Certain aspects of the present disclosure relate to methods and apparatus for blind detection of cell-specific reference signals. Methods and apparatus are provided for detecting a cell-specific reference signal (CRS) in an orthogonal frequency division multiplexed (OFDM) symbol by a user equipment (UE). The method generally includes predicting a current channel response of a current OFDM symbol based on a channel response of at least one previous OFDM symbol, estimating a noise power level of the current OFDM symbol, forming a log likelihood ratio (LLR) of two detection hypotheses based on the predicted current channel response and the estimated noise power level, comparing the LLR to a pre-determined threshold, and determining that at least one CRS is present in the current OFDM symbol based on the comparison.

24 Claims, 8 Drawing Sheets

(51) Int. Cl.
*H04L 25/06* (2006.01)
*H04L 27/26* (2006.01)
*H04L 25/02* (2006.01)

(56) References Cited

U.S. PATENT DOCUMENTS

| | | |
|---|---|---|
| 2006/0227748 A1* | 10/2006 | Stamoulis et al. ............ 370/332 |
| 2011/0116531 A1* | 5/2011 | Gore .................. H04B 7/15585 375/213 |
| 2012/0008511 A1 | 1/2012 | Fan et al. |
| 2012/0027140 A1* | 2/2012 | Weng et al. .................. 375/350 |
| 2012/0113844 A1 | 5/2012 | Krishnamurthy |
| 2013/0114435 A1 | 5/2013 | Wang et al. |
| 2013/0260744 A1* | 10/2013 | Xu et al. ....................... 455/423 |

OTHER PUBLICATIONS

Oularbi M.R., et al., "OFDM system identification using pilot tone signature," 7th International Workshop on Systems, Signal Processing and their Applications (WOSSPA), May 9, 2011, pp. 95-98, XP031951102, DOI: 10.1109/WOSSPA.2011.5931422, ISBN: 978-1-4577-0689-9, p. 95-p. 97.

Zhou Y., et al., "On the performance of generalized likelihood ratio test for data-aided timing synchronization of MIMO systems," 9th International Conference on Communications (COMM), Jun. 21, 2012, pp. 43-46, XP032220469, DOI: 10.1109/ICCOMM.2012.6262589, ISBN: 978-1-4577-0057-6, p. 43-p. 45.

* cited by examiner

BLIND CRS DETECTION

CLAIM OF PRIORITY UNDER 35 U.S.C. §119

This application claims benefit of U.S. Provisional Patent Application Ser. No. 61/877,231, filed Sep. 12, 2013, which is herein incorporated by reference in its entirety.

BACKGROUND

I. Field

Certain aspects of the disclosure generally relate to wireless communications and, more particularly, to blind detection of cell-specific reference signals (CRS).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations (BS) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions associated with other UEs communicating with the neighbor base stations. The interference may degrade performance on both the downlink and uplink.

SUMMARY

Certain aspects of the present disclosure provide methods and apparatus for blind detection (e.g., the user equipment (UE) is not aware of transmission ports or multi-broadcast single frame network (MBSFN) subframe configuration) of cell-specific reference signals (CRS).

Certain aspects provide a method for detecting a cell-specific reference signal (CRS) in an orthogonal frequency division multiplexed (OFDM) symbol by a UE. The method generally includes predicting a current channel response of a current OFDM symbol based on a channel response of at least one previous OFDM symbol, estimating a noise power level of the current OFDM symbol, forming a log likelihood ratio (LLR) of two detection hypotheses based on the predicted current channel response and the estimated noise power level, comparing the LLR to a pre-determined threshold, and determining that at least one CRS is present in the current OFDM symbol based on the comparison.

Certain aspects provide an apparatus for detecting a CRS in an OFDM symbol by a UE. The apparatus generally includes means for predicting a current channel response of a current OFDM symbol based on a channel response of at least one previous OFDM symbol, means for estimating a noise power level of the current OFDM symbol, means for forming a LLR of two detection hypotheses based on the predicted current channel response and the estimated noise power level, means for comparing the LLR to a pre-determined threshold, and means for determining that at least one CRS is present in the current OFDM symbol based on the comparison.

Certain aspects provide an apparatus for detecting a CRS in an OFDM symbol by a UE. The apparatus generally includes at least one processor configured to predict a current channel response of a current OFDM symbol based on a channel response of at least one previous OFDM symbol, estimate a noise power level of the current OFDM symbol, form a LLR of two detection hypotheses based on the predicted current channel response and the estimated noise power level, compare the LLR to a pre-determined threshold, and determine that at least one CRS is present in the current OFDM symbol based on the comparison. The apparatus generally also includes a memory coupled with the at least one processor.

Certain aspects provide a computer program product for detecting a CRS in an OFDM symbol by a UE. The computer program product generally includes a computer readable medium having instructions stored thereon for predicting a current channel response of a current OFDM symbol based on a channel response of at least one previous OFDM symbol, estimating a noise power level of the current OFDM symbol, forming a LLR of two detection hypotheses based on the predicted current channel response and the estimated noise power level, comparing the LLR to a pre-determined threshold, and determining that at least one CRS is present in the current OFDM symbol based on the comparison.

Numerous other aspects including apparatus, systems, computer program products, and processing systems are provided.

DETAILED DESCRIPTION

Aspects of the present disclosure provide methods and apparatus for blind detection of symbols having cell-specific reference signals (CRS), for example, when the user equipment (UE) has no information about the multimedia broadcast single frequency network (MBSFN) pattern and/or number of transmission (Tx) ports. According to certain aspects, the detection may be used for, but is not limited to, interference measurement or cancellation. According to certain aspects, a UE may predict whether CRS is present in a current orthogonal frequency division multiplexing (OFDM) symbol based on a comparison of log likelihood ratio (LLR) values for two hypotheses. The LLR values may be formed based on a predicted current channel response and estimated noise power level.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

EXAMPLE WIRELESS NETWORK

Figure 1:
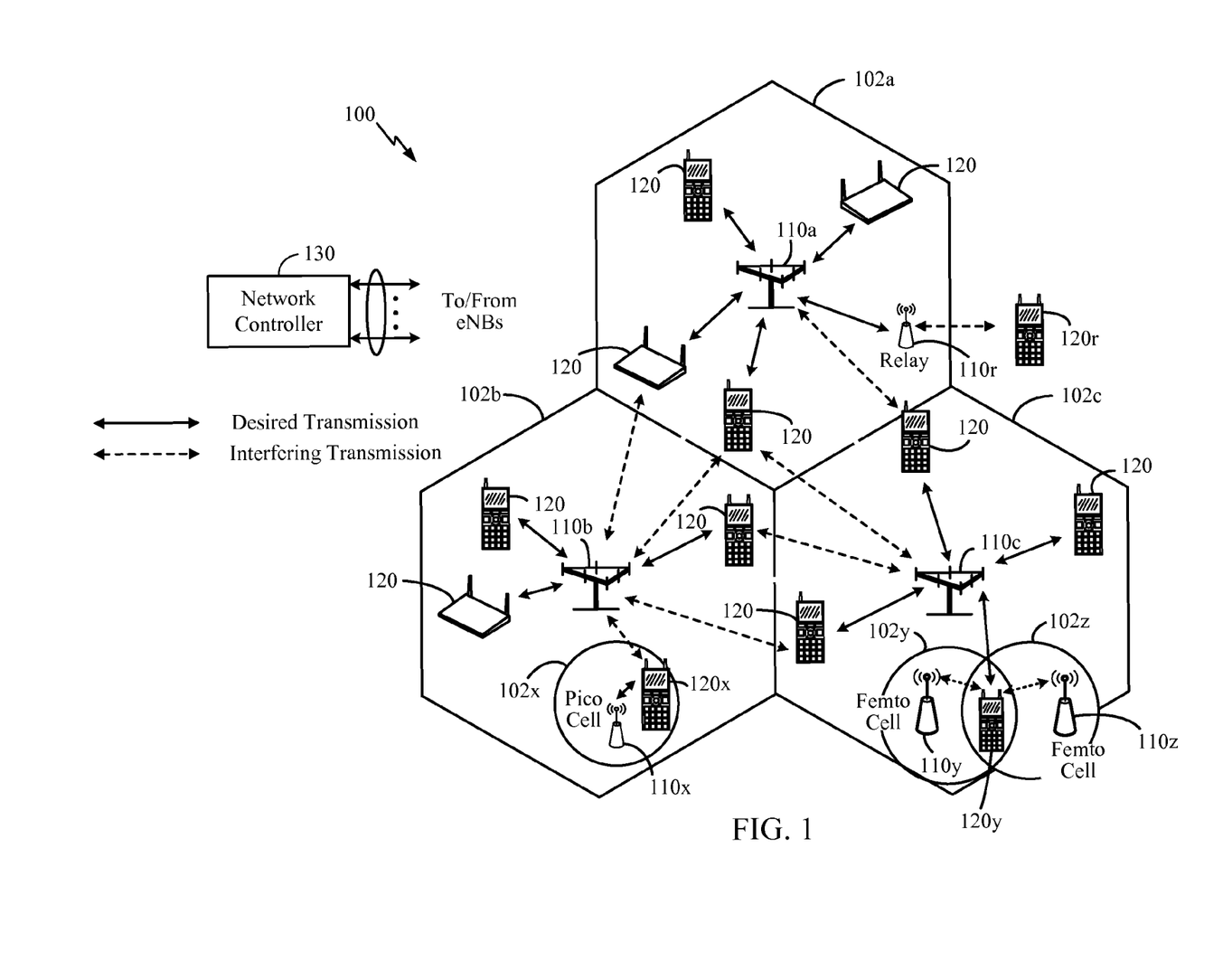
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (e.g., a macro base station). An eNB for a pico cell may be referred to as a pico eNB (e.g., a pico base station). An eNB for a femto cell may be referred to as a femto eNB (e.g., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE. However, in some aspects, the UE may comply with one or more other LTE Release versions.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM.

The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
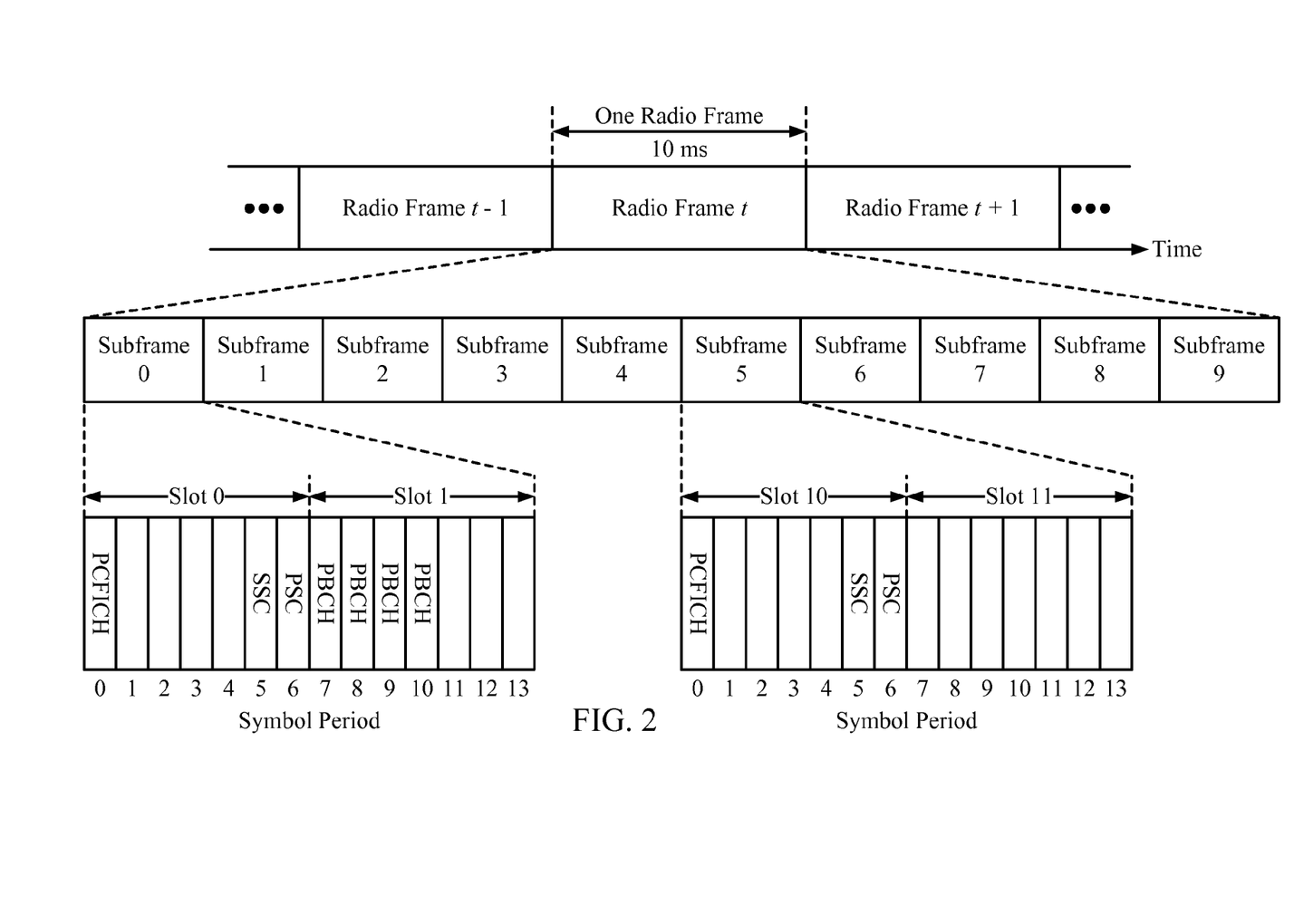
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

In LTE Rel-11, for example, a new control channel (e.g., enhanced PDCCH (ePDCCH)) may be introduced. Unlike the legacy PDCCH, which occupies the first several control symbols in a subframe, ePDCCH may occupy the data region, similar to PDSCH. ePDCCH may help increase control channel capacity, support frequency-domain inter-cell interference coordination (ICIC), achieve improved spatial reuse of control channel resources, support beamforming and/or diversity, operate on a new carrier type (NCT) and in multimedia broadcast single frequency network (MBSFN) subframes, and coexist on the same carrier as legacy UEs. In some embodiments, NCT may employ resources that are originally intended for a first purpose for a second purpose. In some embodiments, NCT may employ resources that are traditionally employed for a first purpose for a second purpose.

Figure 2A:
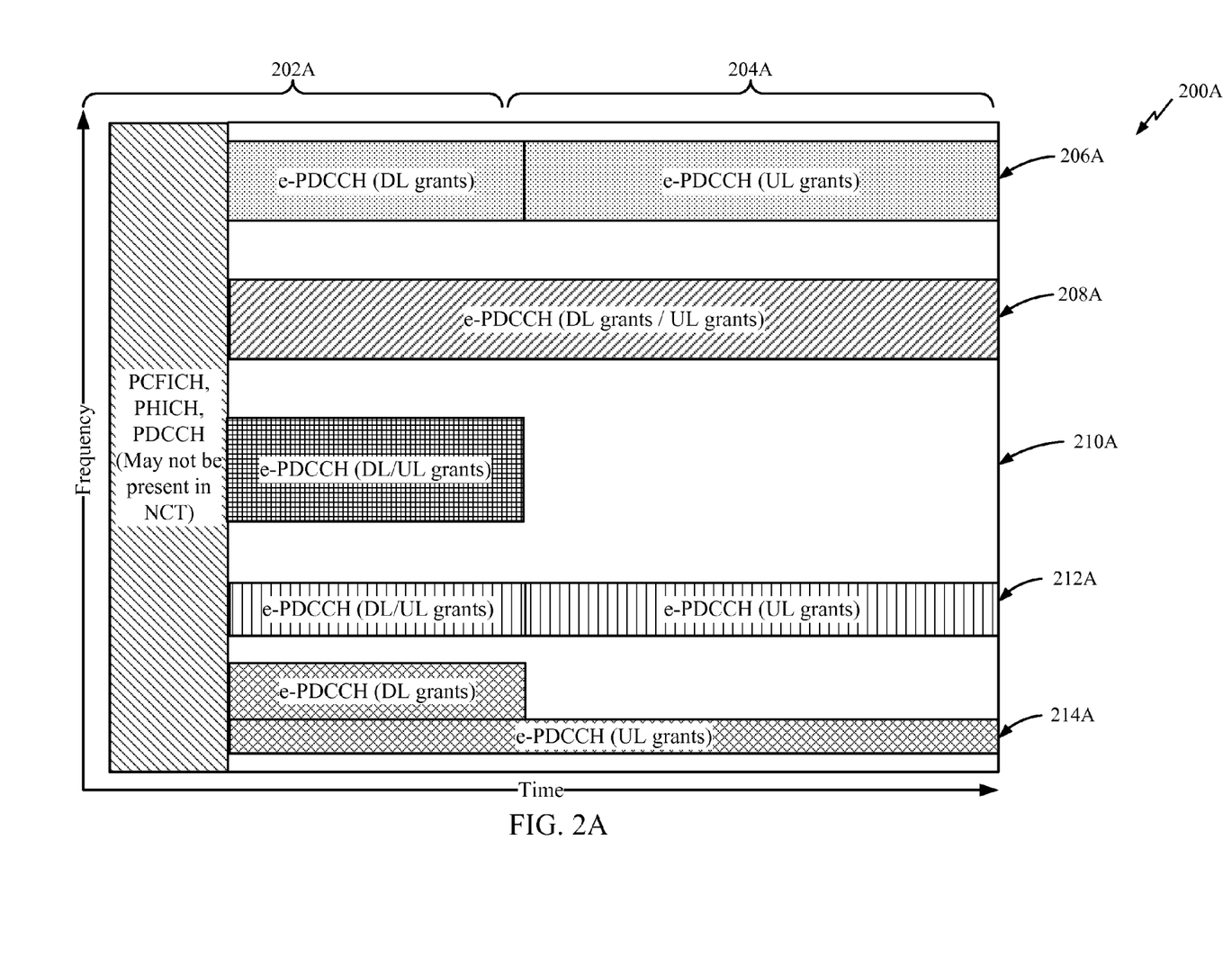
FIG. 2A illustrates an example subframe with various options for enhanced physical downlink control channel (eP-DCCH), in accordance with certain aspects of the present disclosure.

FIG. 2A illustrates an example subframe 200A with various options for ePDCCH, in accordance with certain aspects of the present disclosure. The subframe 200A is divided into a first slot 202A and a second slot 204A, wherein each slot typically comprises 7 symbols in LTE for the normal cyclic prefix (CP) case. Each subframe in LTE spans 1 ms, and therefore, each slot has a duration of 0.5 ms. The first 3 symbols of the subframe 200A may be used for the Physical Control Format Indicator Channel (PCFICH), the Physical HARQ Indicator Channel (PHICH), and the PDCCH. Various ePDCCH structures are available for conveying information in the subframe 400, as illustrated. Both localized and distributed transmission of the enhanced control channel may be supported.

According to a first alternative 206A, the ePDCCH may be transmitted similarly to transmission of a relay PDCCH (R-PDCCH). In this case, DL grants may be transmitted in the first slot 202A, and UL grants may be transmitted in the second slot 204A. For certain aspects, the second slot 204A may be used for downlink data transmission if it is not being used for transmission of UL grants.

According to a second alternative 208A, the ePDCCH may be transmitted in a pure FDM scheme, where DL grants and UL grants span the resource block. As shown, a set of resources in the frequency domain are allocated for transmission of the ePDCCH across a time domain comprising the first and second time slots 202A, 204A. For certain aspects, a subset of RBs multiplexed in the frequency domain with the PDSCH are allocated for transmitting the ePDCCH including both uplink and downlink grants across the first and second time slots 202A, 204A.

According to a third alternative 210A, the ePDCCH may be transmitted in the first slot 202A according to a TDM scheme, where DL and UL grants are transmitted in the first slot. As illustrated for the third alternative 210A, the remaining RBs may be utilized for transmitting the PDSCH data transmissions.

According to a fourth alternative 212A, the ePDCCH may be transmitted in a manner similar to R-PDCCH, where DL and UL grants may be transmitted in the first slot 202A, and UL grants may be transmitted in the second slot 204A. For certain aspects, if a DL grant is transmitted in a first physical resource block (PRB) of a given PRB pair, then a UL grant may be transmitted in a second PRB of the PRB pair. Otherwise, a UL grant may be transmitted in either the first or the second PRB of the PRB pair.

According to a fifth alternative 214A, the ePDCCH may be transmitted using TDM for DL grants in the first slot 202A and FDM for UL grants spanning the first and second slots 202A, 204A.

Figure 2B:
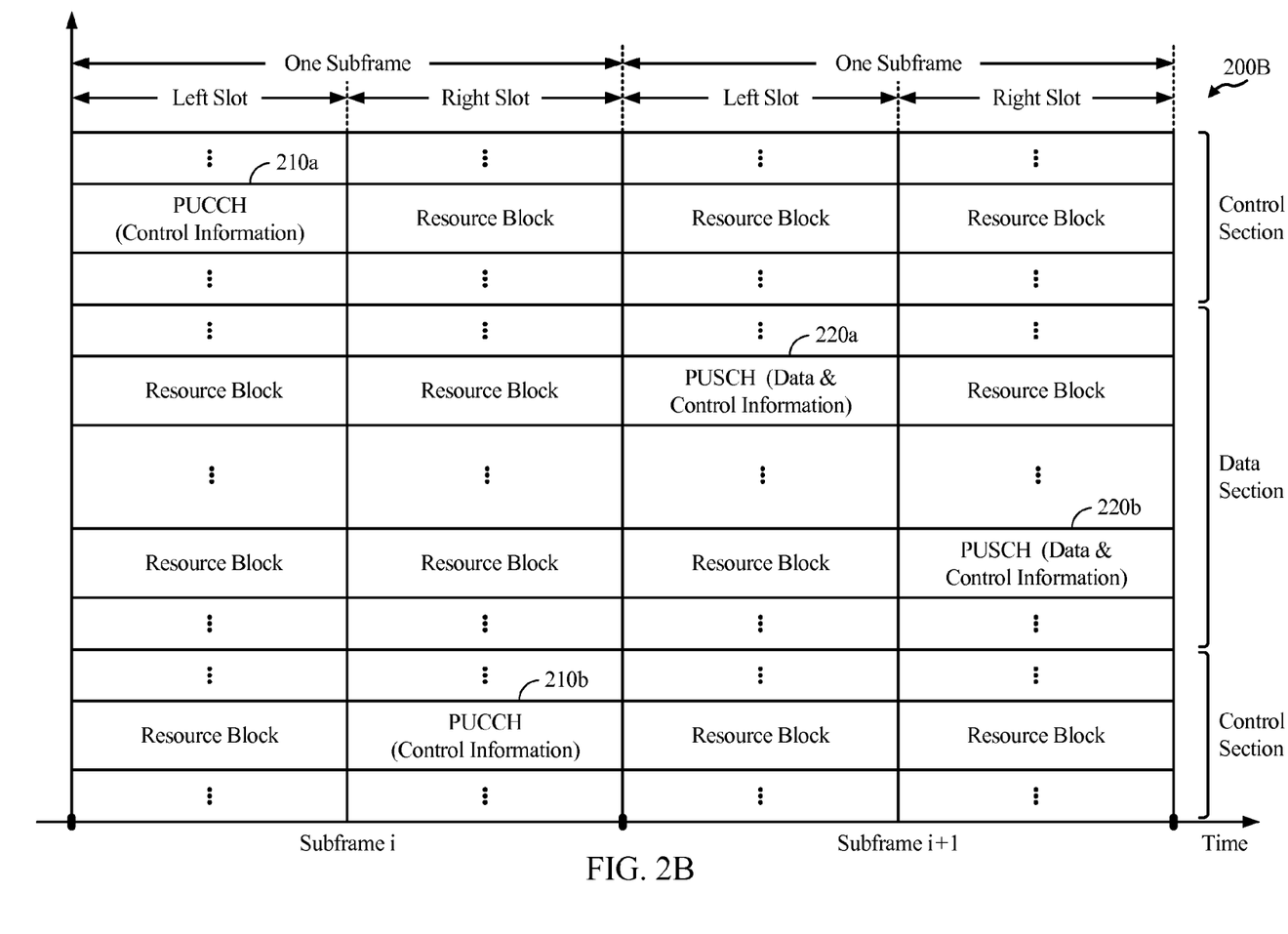
FIG. 2B shows an example format for the uplink in long term evolution (LTE), in accordance with certain aspects of the present disclosure.

FIG. 2B shows an exemplary format 200B for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2B results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2B.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
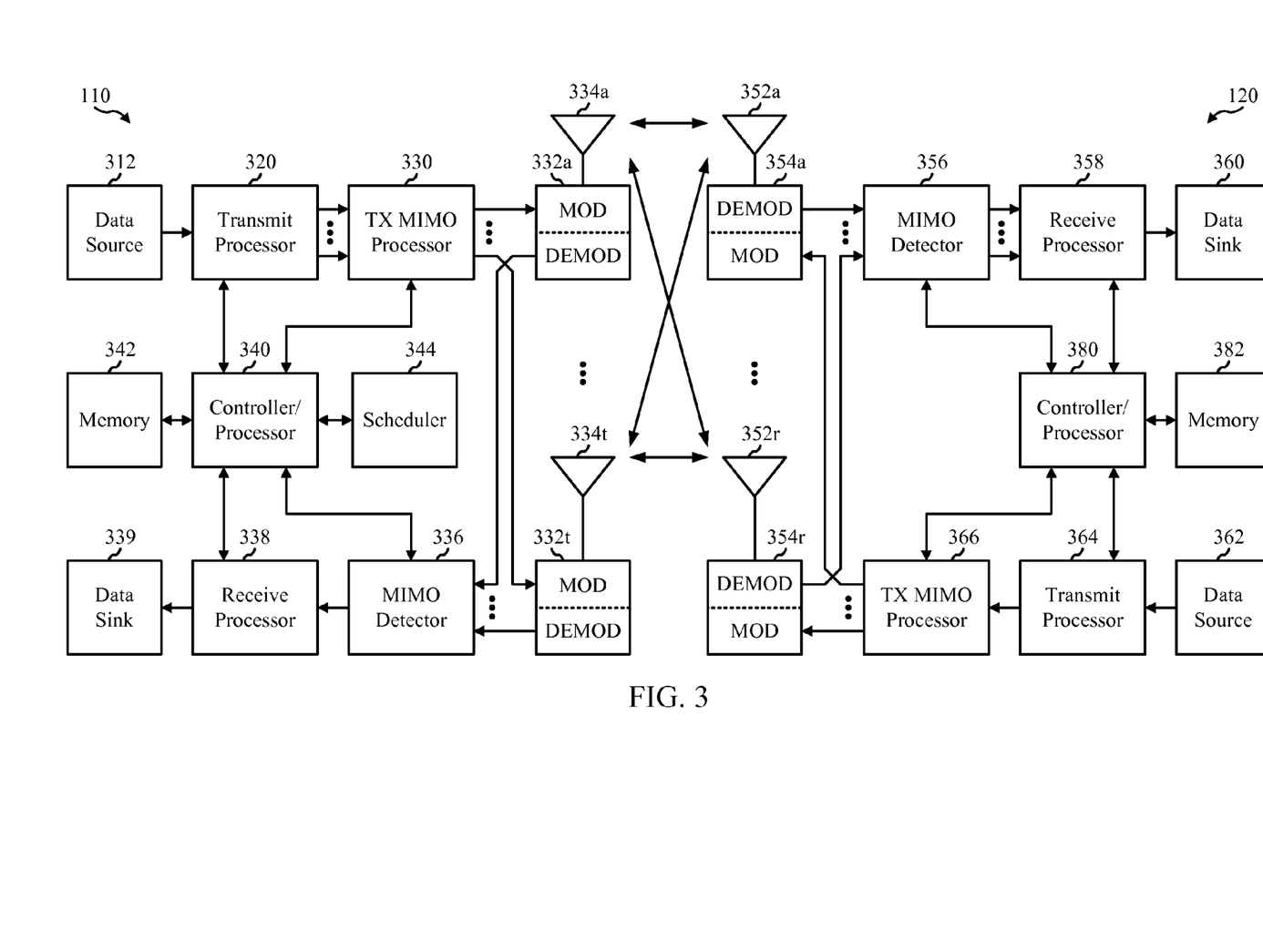
FIG. 3 shows a block diagram conceptually illustrating an example of a eNode B (eNB) in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate one or more reference symbols, e.g., for one or more reference signals like the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and up-convert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, down-convert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate one or more reference symbols for one or more reference signals. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, transmit processor 320 and/or other processors and modules at the eNB 110 may perform or direct operations and/or processes for the techniques described herein. The controller/processor 380, receive processor 358, transmit processor 364 and/or other processors and modules at the UE 120 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

EXAMPLE RESOURCE PARTITIONING

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (e.g., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 4:
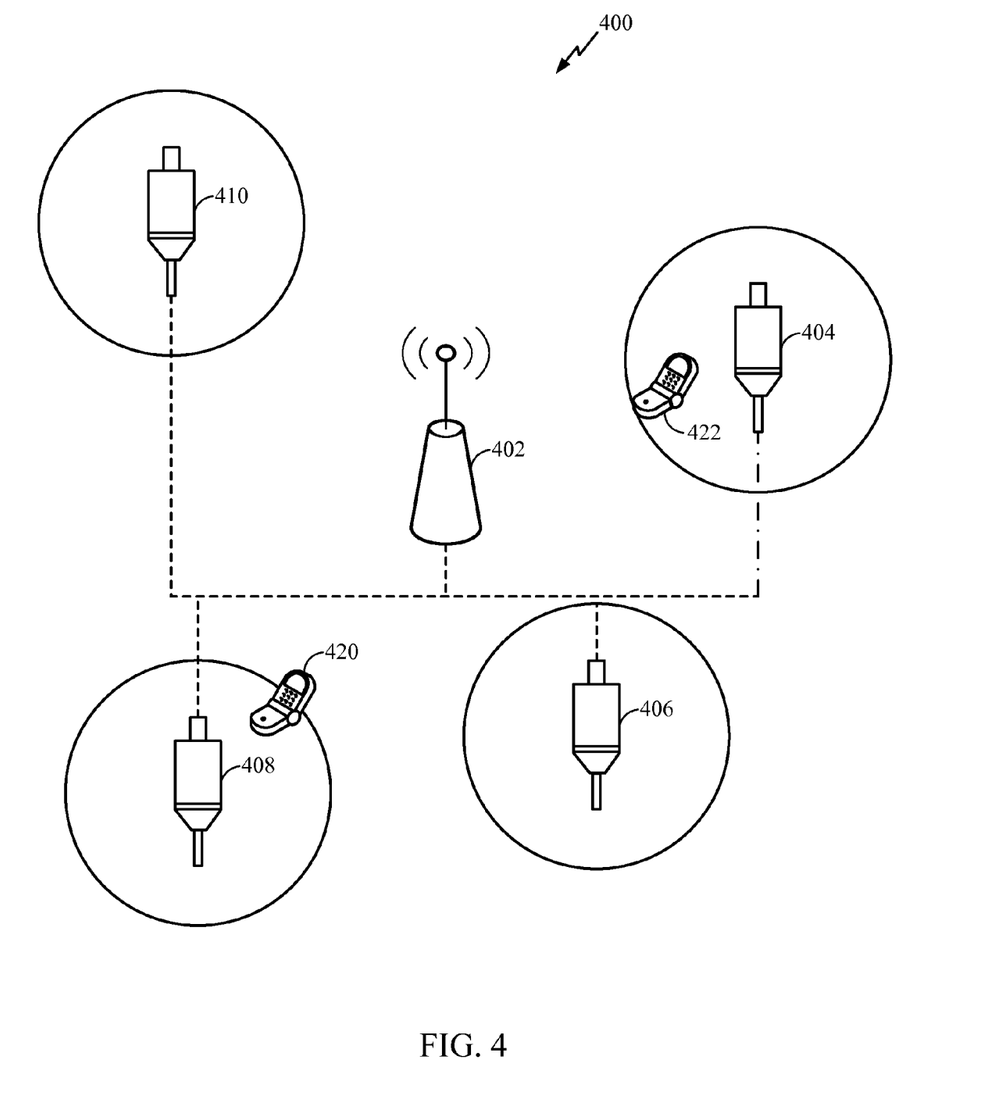
FIG. 4 is a diagram illustrating an example network with a macro eNB and remote radio heads (RRHs), in accordance with certain aspects of the present disclosure.

FIG. 4 is a diagram illustrating a network 400, which includes a macro node and a number of remote radio heads (RRHs) in accordance with certain aspects of the present disclosure. The macro node 402 may be coupled to remote radio heads (RRHs) 404, 406, 408, and 410 with optical fiber. In certain aspects, network 400 may be a homogeneous network or a heterogeneous network and the RRHs 404-410 may be low power or high power RRHs. In an aspect, the macro node 402 handles all scheduling within the cell, for itself and the RRHs. The RRHs may be configured with the same cell identifier (ID) as the macro node 402 or with different cell IDs. If the RRHs are configured with the same cell ID, the macro node 402 and the RRHs may operate as essentially one cell controlled by the macro node 402. On the other hand, if the RRHs and the macro node 402 are configured with different cell IDs, the macro node 402 and the RRHs may appear to a UE as different cells, though all control and scheduling may still remain with the macro node 402. It should further be appreciated that the processing for the macro node 402 and the RRHs 404, 406, 408, 410 may not necessarily have to reside at the macro node. It may also be performed in a centralized fashion at some other network device or entity that is connected with the macro and the RRHs.

As used herein, the term transmission/reception point ("TxP") generally refers to geographically separated transmission/reception nodes controlled by at least one central entity (e.g., eNode B), which may have the same or different cell IDs.

In certain aspects, when each of the RRHs shares the same cell ID with the macro node 402, control information may be transmitted using cell-specific reference signals (CRS) from the macro node 402 or both the macro node 402 and all of the RRHs. The CRS is typically transmitted from each of the transmission points using the same resource elements, and therefore the signals collide. When each of the transmission points has the same cell ID, CRS transmitted from each of the transmission points may not be differentiated. In certain aspects, when the RRHs have different cell IDs, the CRS transmitted from each of the TxPs using the same resource elements may or may not collide. Even in the case, when the RRHs have different cell IDs and the CRS collide, advanced UEs may differentiate CRS transmitted from each of the TxPs using interference cancellation techniques and advanced receiver processing.

In certain aspects, when all transmission points are configured with the same cell ID and CRS is transmitted from all transmission points, proper antenna virtualization is needed if there are an unequal number of physical antennas at the transmitting macro node and/or RRHs. That is, CRS is to be transmitted with an equal number of CRS antenna ports. For example, if the node 402 and the RRHs 404, 406, 408 each have four physical antennas and the RRH 410 has two physical antennas, a first antenna of the RRH 410 may be configured to transmit using two CRS ports and a second antenna of the RRH 410 may be configured to transmit using a different two CRS ports. Alternatively, for the same deployment, macro 402 and RRHs 404, 406, 408, may transmit only two CRS antenna ports from selected two out of the four transmit antennas per transmission point. Based on these examples, it should be appreciated that the number of antenna ports may be increased or decreased in relation to the number of physical antennas.

EXAMPLE RESOURCE MANAGEMENT

Cell-specific reference signals (CRS), used in certain network (e.g., long term evolution (LTE) Release 8) are used for many purposes, for example, timing tracking, frequency tracking, channel estimation, mobility management (e.g., reference signal received power (RSRP)/reference signal received quality (RSRQ) report), channel state information (CSI) feedback, etc. The CRS bandwidth assumed for the above operations is generally wideband (e.g., same as downlink system bandwidth), or, in some cases, a small bandwidth in the center (e.g., 1.4 MHz in the center).

Time-domain interference coordination between cells is desirable. For example, almost blank subframes (ABS) can be configured by higher power class nodes (e.g., macro) to minimize interference to cell-range expansion (CRE) UEs served by lower power class nodes (e.g., femto). In these subframes, higher power class nodes may not transmit any unnecessary signals or transmit only signals with greatly reduced power (e.g., only CRS is transmitted for backward compatibility).

Interference cancellation (e.g., such as cancellation of CRS from higher power class nodes) may become necessary at CRE UE for proper mobility management, CSI feedback, demodulation, etc.

Figure 5:
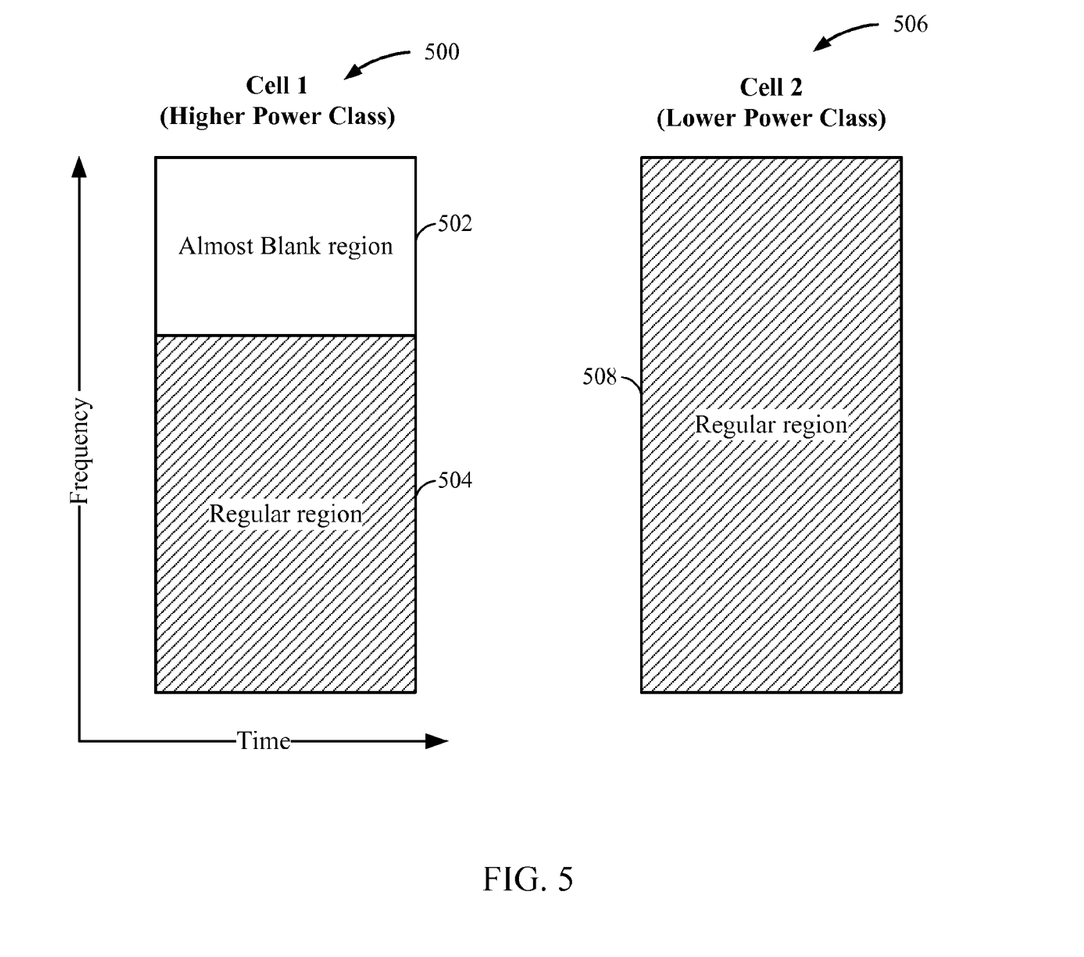
FIG. 5 illustrates example subframes in a heterogeneous network (HetNet), in accordance with certain aspects of the present disclosure.

Besides time domain interference coordination, frequency domain interference domain is also possible, as shown in FIG. 5. Higher power cells (e.g., Cell 1 500 which may be, for example, a macro node such as macro node 402) may transmit as usual (or with a bit lower power) in some fraction of the bandwidth (e.g., Regular region 504), and may not transmit any non-necessary signals or only transmit with some minimal transmission (e.g., potentially with much lower power) in some other fraction of the bandwidth (e.g., Almost Blank region 502) for the benefits of a neighboring cell. A lower power cell (e.g., Cell 2 506 which may be, for example, a femto node or RRH such as RRH 404, 406, 408, or 410) may transmit as usual (or with a bit lower power) in the entire bandwidth (e.g., Regular region 508).

Frequency domain interference coordination may result in overwhelming interference to some transmissions (e.g., reference signals) in some fraction of the bandwidth. Particularly to CRS of lower power class nodes (e.g., femto nodes) when the interfering cell (e.g., a macro node) has non-colliding CRS (e.g., different CRS shifts). Such frequency domain interference is frequency-dependent and subframe-dependent. The subframe dependency occurs because serving cells may have multi-broadcast single frame network (MBSFN) subframes or non-MBSFN subframes. CRS is absent from the MBSFN region of the subframe

EXAMPLE BLIND CRS DETECTION

In long term evolution (LTE), higher layer can configure a subset of the downlink subframes in a radio frame on a carrier supporting physical downlink shared channel (PDSCH) transmission as multi-broadcast single frame network (MBSFN) subframes. Each MBSFN subframe may be divided into a non-MBSFN region and a MBSFN region. The non-MBSFN region may occupy the first one or two orthogonal frequency division multiplexed (OFDM) symbols (e.g., the conventional control region of the subframe) in an MBSFN subframe. The MBSFN region in an MBSFN subframe may be defined as the OFDM symbols not used for the non-MBSFN region. As mentioned above, a particular symbol in an MBSFN may or not have a cell-specific reference signal (CRS) transmission.

System information block 2 (SIB2) may carry radio resource configuration information, which is common for all user equipments (UEs). SIB2 information can include random access channel (RACH) related parameters, idle mode paging configurations, physical uplink control channel (PUCCH) and physical uplink shared channel (PUSCH) configurations, uplink power control and sounding reference signal (SRS) configurations, uplink carrier frequency/bandwidth, and cell barring information. In SIB2, the radio resource control (RRC) information element (IE), MBSFN-SubframeConfig, may specify the configuration of MBSFN subframes. In frequency division duplexing (FDD), subframes {1,2,3,6,7,8} can be configured as MBSFN subframes via a 6-bit bit-string.

Almost blank subframes (ABS) may be utilized to achieve time-domain interference coordination of serving cell and interfering cell's downlink (DL) transmission. Certain networks (e.g., LTE Rel-10) may define two types of ABS subframes—normal and MBSFN. For normal ABS subframes, CRS for antenna ports {0, 1} may be transmitted in four OFDM symbols within the normal ABS subframe. For MBSFN ABS subframes, CRS for antenna ports 10, 11 may only be transmitted in the first OFDM symbol in the configured MBSFN ABS subframe.

According to certain aspects, to perform CRS interference cancellation, the UE may detect which symbols are used for CRS transmission. For example, before performing CRS interference cancellation, the UE first detects a MBSFN subframe so that the UE knows which CRS port(s) are causing the interference (e.g., which symbols are used for CRS transmission). The UE knows the MBSFN configuration of its serving cell from SIB decoding.

According to certain aspects, the UE may not decode SIBs from interfering neighbor cells and the higher layer may not provide MBSFN configuration information of the strong interfering neighboring cells to the UE. Therefore, the UE may have no knowledge about whether a particular symbol is used for CRS transmission. For example, this may be the case for Rel-10 enhanced inter-cell interference coordination (eICIC). In this case, the UE may perform blind MBSFN detection. MBSFN detection may be equivalent to CRS port detection at certain OFDM symbols.

According to certain aspects, the UE may blindly detect the presence of CRS from a particular antenna port for accurate measurement of a weak neighbor cell, while the UE does not have knowledge of the weak neighbor cell master information block (MIB) yet. A MIB may provide information regarding how many CRS transmission ports are configured. Therefore, without knowledge of the MIB, the UE does not know number of transmission ports for CRS. This may occur when the UE is still served by a high-power macro cell before handover to low-power pico-cell for cell range expansion (CRE). Before, deciding whether to handover, a search may be performed to detect a possible physical-layer cell identity (PCI). Once the PCI candidate is passed to a UE by a searcher, the UE may perform CRS port detection to determine whether or not the PCI obtained from the searcher is fake (e.g., an erroneous detection) and/or to determine the number of CRS ports at the candidate cell.

Techniques and approaches are provided herein for blind detection of symbols having CRS, when the UE has no information about MBSFN pattern and/or number of transmission (Tx) ports. According to certain aspects, the detection may be used for, but is not limited to, interference measurement or cancellation.

According to certain aspects, the UE may blindly detect MBSFN based on a current observation (e.g., what is seen in the current OFDM symbol), previous observation history (e.g., what is seen in previous OFDM symbols), noise power estimation of the current OFDM symbol, and the probability of false alarm and probability of detection. This information may be used to determine whether CRS is present in the current OFDM symbol.

According to certain aspects, the UE may first predict current channel response from previous observation—either in the time domain or in the frequency domain. For example, the UE may have antenna history for an antenna based on previous OFDM symbols, which may be used to predict the current channel response. The UE may also estimate noise power in the current OFDM symbol. Then the UE may form (e.g., using the estimated noise power and channel response) the likelihood of two detection hypotheses (e.g., CRS port is present in the symbol versus the CRS port is not present in the symbol) and calculate the log likelihood ratio (LLR).

According to certain aspects, the UE may declare the CRS port as detected if the LLR passes (e.g., exceeds) a certain threshold. The threshold may be determined by controlling the probability of false alarm (e.g., false detection) and the probability of detection. According to certain aspects, the UE may decide that CRS is present in the current OFDM symbol if the likelihood that CRS is present (L1) is more likely than the likelihood that CRS is absent (L2) in the current OFDM symbol.

In one example, after predicting the current channel response and estimating the noise power, the UE may determine LLR of the two detection hypotheses based on the following equation:

$$T=F_1/F_2,$$

wherein T is the LRR, $F_1$ is a function including a summation over receive antennas of a ratio of a mathematical operation on (e.g., a product of) a real portion of the predicted channel response and conjugate of the current observed symbol to the estimated noise level, and $F_2$ is a function including the square root of a summation over receive antennas of a ratio of a mathematical operation on (e.g., a product of) the real portion of the predicted channel response and the conjugate of the predicted channel response to the estimated noise level. In aspects, to wit, $$T = \frac{\sum_{q=0}^{N_{rx}-1} \left( \frac{\mathcal{R}\{R_q Y_q^\dagger\}}{\sigma_q^2} \right)}{\sqrt{\sum_{q=0}^{N_{rx}-1} \left( \frac{\mathcal{R}\{R_q R_q^\dagger\}}{\sigma_q^2} \right)}}$$

and the presence of CRS from antenna port p of cell m may be declared if T exceeds a pre-defined threshold λ, e.g., T>λ, where the threshold is chosen such that Pr(False Alarm) is controlled small while Pr(Detection) is acceptable. In aspects, setting λ=2.5 will render Pr(False Alarm) around 0.1% while ensuring Pr(Detection) greater than 90% at −8 dB SINR.

According to certain aspects, the LLR may be compared to a pre-defined threshold. If the LLR passes (e.g., exceeds) the pre-defined threshold, then CRS at a particular antenna port may be declared. Alternatively, if the LLR is below the pre-defined threshold, then CRS may be declared absent at the particular antenna port.

According to certain aspects, the pre-defined threshold may be chosen such that the probability of false alarm is as small as possible to maintain an acceptable probability of detection. In aspects, the pre-defined threshold may be chosen according to any described balance between probability of false alarm and probability of detection.

Figure 6:
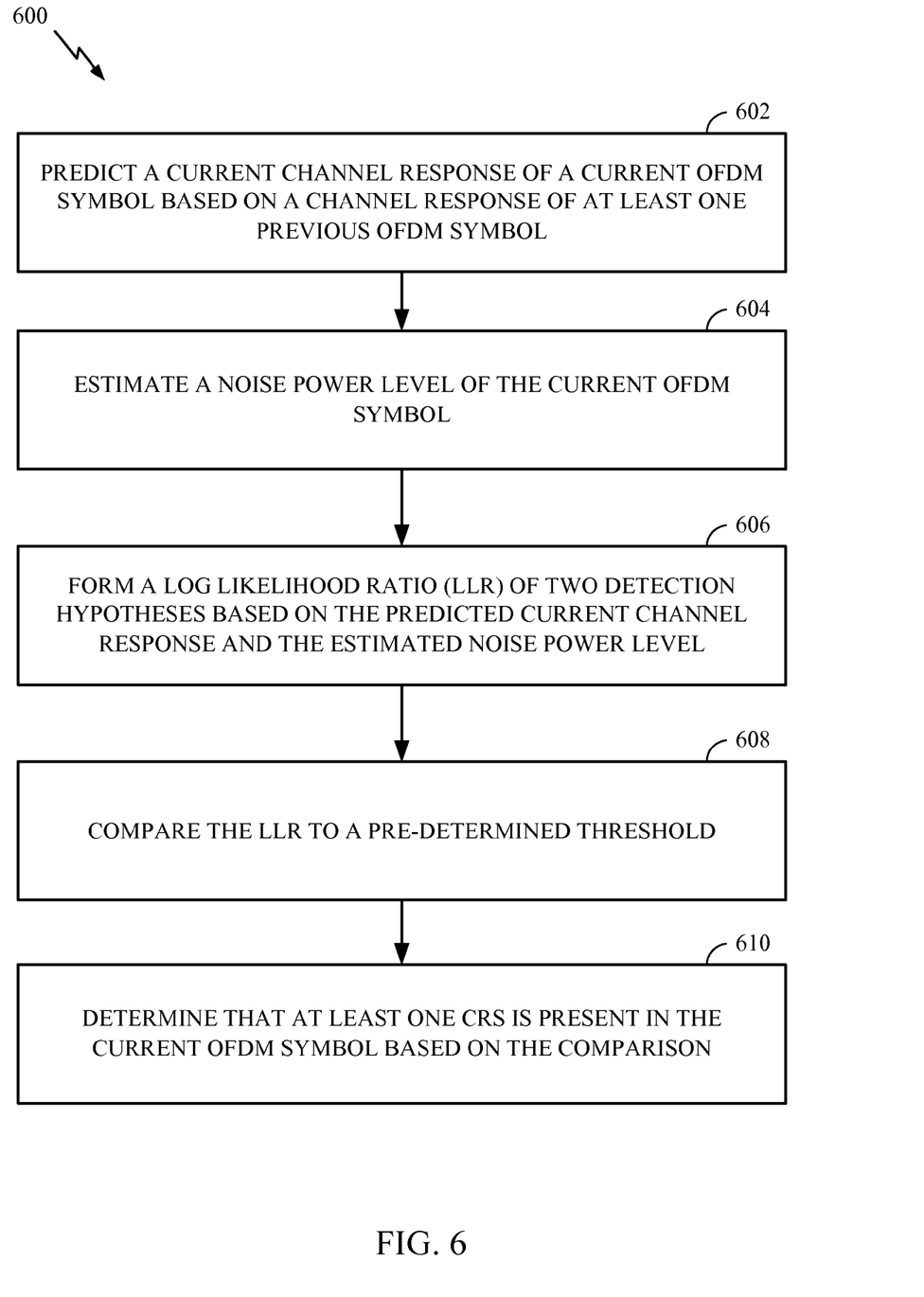
FIG. 6 illustrates example operations that may be performed by a UE, in accordance with certain aspects of the present disclosure.

FIG. 6 illustrates example operations 600 for detecting a cell-specific reference signal (CRS) in an orthogonal frequency division multiplexed (OFDM) symbol, according to certain aspects of the present disclosure. The operations 600 may be performed, for example, by a user equipment (UE) (e.g., UE 120). The operations 600 may begin, at 602, by predicting a current channel response of a current OFDM symbol based on a channel response of at least one previous OFDM symbol. According to certain aspects, the UE may predict the channel response of the current OFDM symbol in the time domain or in the frequency domain.

At 604, the UE may estimate a noise power level of the current OFDM symbol.

At 606, the UE may form a log likelihood ratio (LLR) of two detection hypotheses based on the predicted current channel response and the estimated noise power level. According to certain aspects, the two detection hypotheses are CRS is present in the current OFDM symbol and CRS is not present in the current OFDM symbol.

At 608, the UE may compare the LLR to a pre-determined threshold. According to certain aspects, the pre-determined threshold may be selected based on a tradeoff between a desired probability of detection and an acceptable probability of false detection.

At 610, the UE may determine that at least one CRS is present in the current OFDM symbol based on the comparison. According to certain aspects, the UE does not have knowledge of the MBSFN subframe configuration or a number of Tx ports. According to certain aspects, the UE determines that CRS is present if the LLR exceeds a threshold.

According to certain aspects, CRS interference cancellation may be performed on the current OFDM symbol once CRS is detected.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for detecting a cell-specific reference signal (CRS) in an orthogonal frequency division multiplexed (OFDM) symbol by a user equipment (UE), comprising:
    predicting a current channel response of a current OFDM symbol based on a channel response of at least one previous OFDM symbol;
    estimating a noise power level of the current OFDM symbol;
    forming a log likelihood ratio (LLR) of two detection hypotheses based on the predicted current channel response and the estimated noise power level;
    comparing the LLR to a pre-determined threshold; and
    determining that at least one CRS is present in the current OFDM symbol based on the comparison.

2. The method of claim 1, wherein determining comprises determining without the UE having knowledge of at least one of a multi-broadcast single frame network (MBSFN) subframe configuration or a number of transmission ports.

3. The method of claim 1, wherein predicting comprises predicting the current channel response of the current OFDM symbol in one of a time domain or a frequency domain.

4. The method of claim 1, wherein the two detection hypotheses comprise a first detection hypothesis that at least one CRS is present in the current OFDM symbol and a second detection hypothesis that at least one CRS is not present in the current OFDM symbol.

5. The method of claim 1, wherein forming the LLR of the two detection hypotheses based on the predicted current channel response and the estimated noise power level comprises forming the LLR as a ratio of a first function and a second function.

6. The method of claim 5, wherein the first function comprises a summation over receive antennas of a ratio of a real portion of a product of the predicted current channel response and a conjugate of the current OFDM symbol to the estimated noise power level.

7. The method of claim 5, wherein the second function comprises a square root of a summation over receive antennas of a ratio of a real portion of a product of the predicted current channel response and a conjugate of the predicted current channel response to the estimated noise power level.

8. The method of claim 1, wherein determining that at least one CRS is present in the current OFDM symbol based on the comparison comprises determining that CRS is present in the current OFDM symbol if the LLR passes the pre-determined threshold.

9. The method of claim 1, wherein the pre-determined threshold is based on a probability of false detection and a probability of detection.

10. The method of claim 9, wherein the pre-determined threshold is chosen such that the probability of false detection is reduced while maintaining a desired probability of detection.

11. The method of claim 1, further comprising performing CRS interference cancellation on the current OFDM symbol.

12. An apparatus for detecting a cell-specific reference signal (CRS) in an orthogonal frequency division multiplexed (OFDM) symbol by a user equipment (UE), comprising:
    means for predicting a current channel response of a current OFDM symbol based on a channel response of at least one previous OFDM symbol;
    means for estimating a noise power level of the current OFDM symbol;
    means for forming a log likelihood ratio (LLR) of two detection hypotheses based on the predicted current channel response and the estimated noise power level;
    means for comparing the LLR to a pre-determined threshold; and
    means for determining that at least one CRS is present in the current OFDM symbol based on the comparison.

13. The apparatus of claim 12, wherein the means for determining comprises means for determining without the UE having knowledge of at least one of a multi-broadcast single frame network (MBSFN) subframe configuration or a number of transmission ports.

14. The apparatus of claim 12, wherein the means for predicting comprises means for predicting the current channel response of the current OFDM symbol in one of a time domain or a frequency domain.

15. The apparatus of claim 12, wherein the two detection hypotheses comprise a first detection hypothesis that at least one CRS is present in the current OFDM symbol and a second detection hypothesis that at least one CRS is not present in the current OFDM symbol.

16. The apparatus of claim 12, wherein the means for forming the LLR of the two detection hypotheses based on the predicted current channel response and the estimated noise power level comprises means for forming the LLR as a ratio of a first function and a second function.

17. The apparatus of claim 16, wherein the first function comprises a summation over receive antennas of a ratio of a real portion of a product of the predicted current channel response and a conjugate of the current OFDM symbol to the estimated noise power level.

18. The apparatus of claim 16, wherein the second function comprises a square root of a summation over receive antennas of a ratio of a real portion of a product of the predicted current channel response and a conjugate of the predicted current channel response to the estimated noise power level.

19. The apparatus of claim 12, wherein the means for determining that at least one CRS is present in the current OFDM symbol based on the comparison comprises means for determining that CRS is present in the current OFDM symbol if the LLR passes the pre-determined threshold.

20. The apparatus of claim 12, wherein the pre-determined threshold is based on a probability of false detection and a probability of detection.

21. The apparatus of claim 20, wherein the pre-determined threshold is chosen such that the probability of false detection is reduced while maintaining a desired probability of detection.

22. The apparatus of claim 12, further comprising means for performing CRS interference cancellation on the current OFDM symbol.

23. An apparatus for detecting a cell-specific reference signal (CRS) in an orthogonal frequency division multiplexed (OFDM) symbol by a user equipment (UE), comprising:
at least one processor configured to predict a current channel response of a current OFDM symbol based on a channel response of at least one previous OFDM symbol; estimate a noise power level of the current OFDM symbol; form a log likelihood ratio (LLR) of two detection hypotheses based on the predicted current channel response and the estimated noise power level; compare the LLR to a pre-determined threshold; and determine that at least one CRS is present in the current OFDM symbol based on the comparison; and
a memory coupled with the at least one processor.

24. A computer program product for detecting a cell-specific reference signal (CRS) in an orthogonal frequency division multiplexed (OFDM) symbol by a user equipment (UE), the computer-program product comprising:
a non-transitory computer readable medium having computer executable instructions that, in response to execution, cause a processor to perform operations, comprising:
predicting a current channel response of a current OFDM symbol based on a channel response of at least one previous OFDM symbol;
estimating a noise power level of the current OFDM symbol;
forming a log likelihood ratio (LLR) of two detection hypotheses based on the predicted current channel response and the estimated noise power level;
comparing the LLR to a pre-determined threshold; and
determining that at least one CRS is present in the current OFDM symbol based on the comparison.

* * * * *